United States Patent [19]
Kempf

[11] Patent Number: 4,458,993
[45] Date of Patent: Jul. 10, 1984

[54] FINGERPRINT COMPARATOR

[76] Inventor: Paul S. Kempf, P.O. Box 690, Solana Beach, Calif. 92075

[21] Appl. No.: 308,429

[22] Filed: Oct. 5, 1981

[51] Int. Cl.³ .............................................. G01B 9/08
[52] U.S. Cl. ..................... 353/82; 356/393; 353/94; 353/78
[58] Field of Search .................. 353/82, 34, 30, 37, 353/97–99, 94, 78; 356/391, 392, 393

[56] References Cited

U.S. PATENT DOCUMENTS

| | | | |
|---|---|---|---|
| 2,365,613 | 12/1944 | Wibmer et al. | 356/391 X |
| 2,500,051 | 3/1950 | Wolff, Jr. | 356/391 |
| 3,376,782 | 4/1968 | Whitley et al. | 356/393 |
| 3,489,494 | 1/1970 | Snider | 353/67 |
| 3,535,030 | 10/1970 | Miller | 353/36 |
| 3,617,120 | 11/1971 | Roka | 356/393 X |
| 3,888,593 | 6/1975 | Kempf | 356/393 |
| 4,065,204 | 12/1977 | Lipkins | 350/102 |
| 4,168,912 | 9/1979 | Kempf | 356/394 |
| 4,232,968 | 11/1980 | Kempf | 356/393 |

FOREIGN PATENT DOCUMENTS

| | | | |
|---|---|---|---|
| 509308 | 10/1930 | Fed. Rep. of Germany | 356/393 |
| 1120177 | 12/1961 | Fed. Rep. of Germany | 353/82 |
| 62791 | 3/1949 | Netherlands | 356/391 |

Primary Examiner—Harry N. Haroian
Attorney, Agent, or Firm—Brown & Martin

[57] ABSTRACT

A fingerprint comparator includes a projection system including a source of light and a carrier for mounting samples of prints to be compared with an optical system for projecting the images of the samples side-by-side on a screen with one image reverted and the screen divided with the images being movable toward and from the dividing line appearing to merge and emerge from the central dividing line for a precise adjacent comparison at the dividing line. An alternate embodiment uses a split video screen and provides for remote transmission of either the record or sample print.

8 Claims, 8 Drawing Figures

FINGERPRINT COMPARATOR

BACKGROUND OF THE INVENTION

The present invention relates to fingerprint comparison and pertains particularly to a method and apparatus for fingerprint comparison.

The most reliable means of identification of a person is by the use of fingerprint comparison. In over one hundred years of fingerprint comparison no two individuals have been found to have identical fingerprints. The mobility of today's society and the extensive use of credit, charges, and checks mandate rapid and positive identification of individuals. While fingerprint comparison is the most reliable means of positive identification of individuals, simple and effective fingerprint comparison techniques are not readily available to merchants and security personnel.

The currently used techniques of fingerprint comparison are time consuming and require the services of a highly skilled and trained technician. It is therefore desirable that a simple and effective means of fingerprint comparison be available.

SUMMARY AND OBJECTS OF THE INVENTION

It is therefore the primary object of the present invention to provide an improved method and apparatus for fingerprint comparison.

In accordance with the primary aspect of the present invention a fingerprint comparison apparatus includes a projection system for projecting the images of a reference fingerprint and a separate sample of a fingerprint on a screen in a side-by-side arrangement adjacent a dividing line with one print being reverted to be a mirror image of the other print, and means for moving the prints simultaneously toward and away from the dividing line to give the appearance of merging and emerging at the dividing line. The method of invention includes the steps of selecting and projecting comparison samples in a side-by-side relation on a divided screen reverting one image to appear as a mirror image of the other print, while simultaneously moving the print images toward and away from the dividing line to simulate the appearance of merging and emerging at the line while viewing the images at and adjacent the line of division to detect differences in the adjacent portions of the print.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
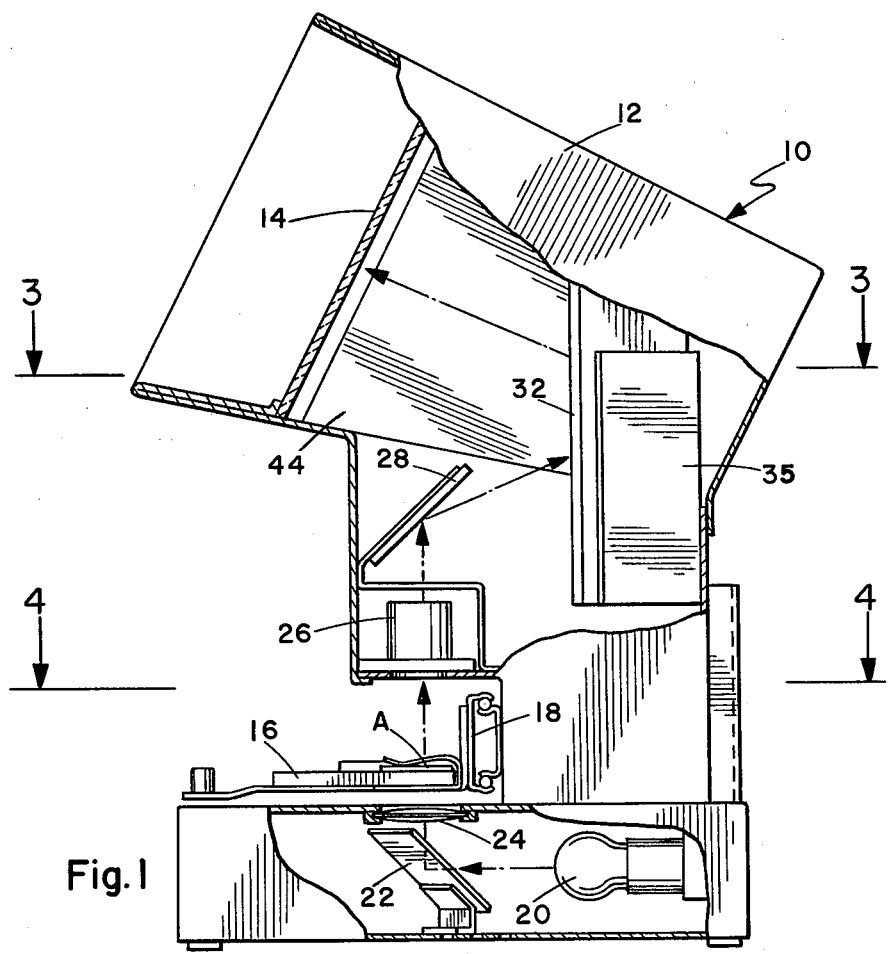
FIG. 1 is a side elevation view of the comparator with portions cut away to show the components of one optical path.
Figure 2:
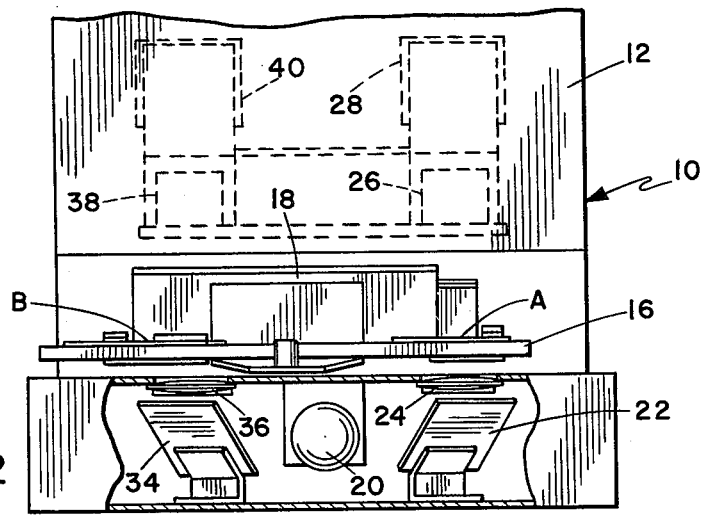
FIG. 2 is a front elevational view of the lower portion of the comparator with portions cut away.

Turning to FIG. 1 of the drawing a comparator system in accordance with the invention is designated generally by the numeral 10. The system includes a housing 12 made up of several sections and in which is mounted an optical system to be described for projecting fingerprint images on a divided screen 14. The system is designed to project transparencies of fingerprints side-by-side on a screen for comparison purposes. An opaque print is preferably formed or made on a transparent backing such as by wiping the fingertips across a powder containing pad and impressing the finger into a pressure sensitive adhesive on a transparent backing. This provides an image that can be easily projected on a simple inexpensive system as herein described.

The system includes a carriage 16 mounted on a track 18 on the housing and having a transparent section over which prints A and B to be compared are mounted. The carriage 16 is movable back and forth in either direction through the lens system. The projection system includes a source of light such as a single projection lamp 20 in the lower housing section with a system of mirrors and lenses for projecting images onto screen 14. The lens system includes a first mirror 22 directing the light through a condenser lens 24 which focuses the light onto an object A such as the impression of a print with a projection lens 26 projecting the image by way of mirrors 28 and a pair of mirrors 30 and 32 mounted at right angles to one another while projecting or reverting the image and projecting it onto one-half of the screen 14.

Figure 3:
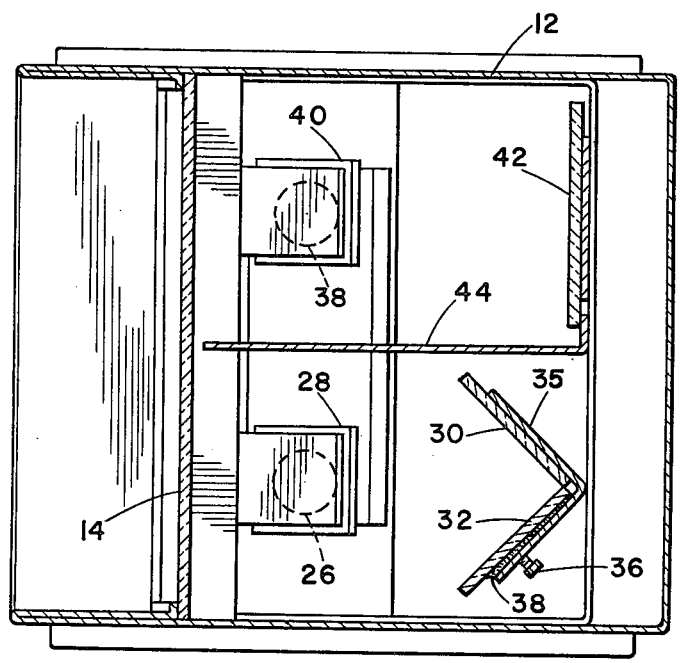
FIG. 3 is a sectional view taken on line 3—3 of FIG. 1.

The lens system for projecting the image of object B includes a mirror 34 taking light from projection lamp 20, projecting it by way of condenser 36 through the print B by way of projection lens 38 and mirrors 40 and 42 onto the other half of screen 14. This simple inexpensive projection system enables the use of a single projection bulb and also the use of a simple mirror/lens system for reverting one image. This avoids the necessity of precision ground prisms for the image reversing process. In reversing the image by means of mirrors 30 and 32 precise alignment of the mirrors are required. Accordingly, in a preferred approach to this, mirrors 30 and 32 are mounted in a fixture 34 as shown in FIG. 3 with adjusting means such as a screw 36 so that the mirrors can be adjusted for optimum adjustment and then cemented into place by the application of an epoxy or the like 38.

Figure 4:
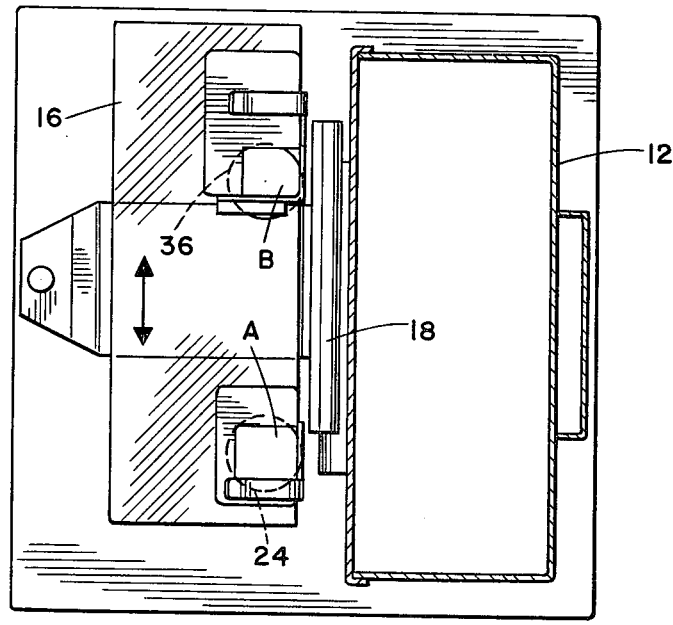
FIG. 4 is a sectional view taken on line 4—4 of FIG. 1.

With this arrangement print images A and B are projected simultaneously onto the separate sections of the screen 14 with an apparent division at the line indicated therebetween. A central baffle or lightstop 44 between mirrors 42 and 30 and extending forward to the screen 14 provides a sharp image separation and prevents overlap. The images can be made to appear to merge into and emerge from or out of the line or edge separating the screen by movement of the carriage 16 back and forth as shown by the arrow in FIG. 4. These two images for comparison purposes may be projected either side-by-side or one above the other as preferred. However, since fingerprints are essentially vertical in construction the preferred method of projective comparison is in a side-by-side arrangement as shown.

Figure 5:
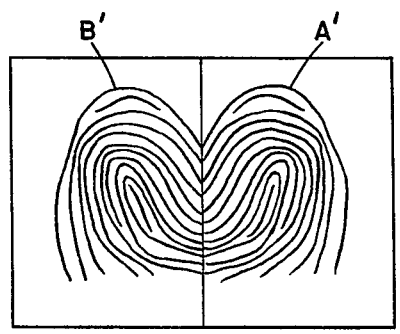
FIG. 5 is a front elevational view of the screen illustrating the comparison of identical prints.

With this arrangement as seen in FIG. 5 an image A' will be projected on one side of screen 14. An image B' for comparison purposes will be projected on screen 14. If these are the same print or identical in construction then one will appear to be a mirror image of the other. Movement of the carriage 18 will move the images toward and away from the dividing line therebetween.

Turning specifically to FIG. 5 there is illustrated the identical fingerprint projected as image A' and as image B'. With this arrangement the precise lines correspond and appear to be coming out of the center dividing line between the two separate sections of the screen 14. As is apparent each print will have a corresponding mirror image portion coming out of the center line for identical prints. If the prints are not identical then distinctions will appear obvious along the area adjacent the center line with no corresponding adjacent lines, or with breaks in the correspondence.

Figure 6:
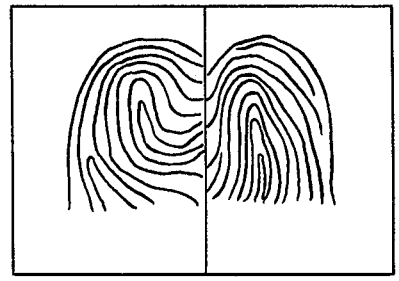
FIG. 6 is a front elevational view of the screen showing the comparison of different prints.
Figure 7:
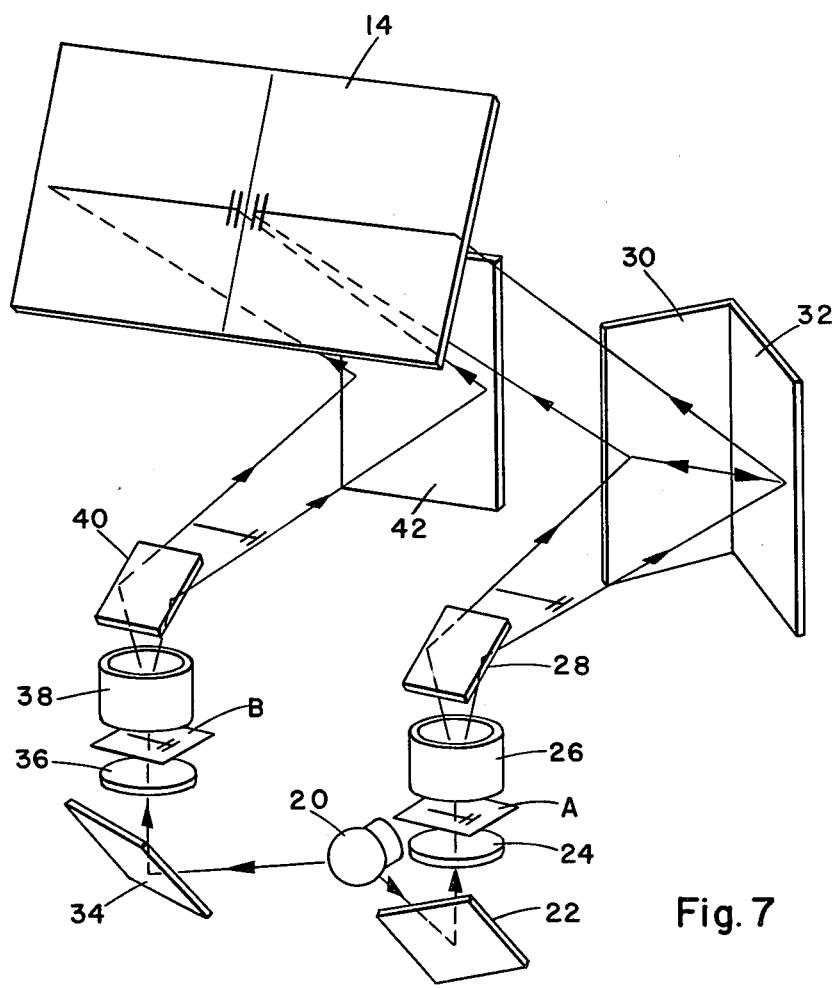
FIG. 7 is a schematic view of the optical system.

Turning to FIG. 6, for example, there is illustrated an image of different prints. As is apparent, although the prints may be somewhat similar, different lines appear at the edge of the center line. Thus, it is clear that the two prints are not the same print. This method and apparatus permits the quick and easy comparison of fingerprints by the average untrained clerk or a security guard for example. Although the prints could be projected and compared in a simple side-by-side reverted or nonreverted comparison, the reverted side-by-side projection is preferred.

With this system it is contemplated that a reference print will be available preferably in the form of opaque image on a transparent backing either from an identification card, charge card, company records or some other form. A print is then taken from the individual for comparison purposes and can be easily and quickly taken on a printing kit as previously described utilizing an opaque powder such a talcum powder or the like which avoids messy inks and the like. Such print and comparison with a projection system in accordance with the above described invention can be taken and compared in less than a minute or more specifically in about 8 to 15 seconds without the necessity of special training.

Figure 8:
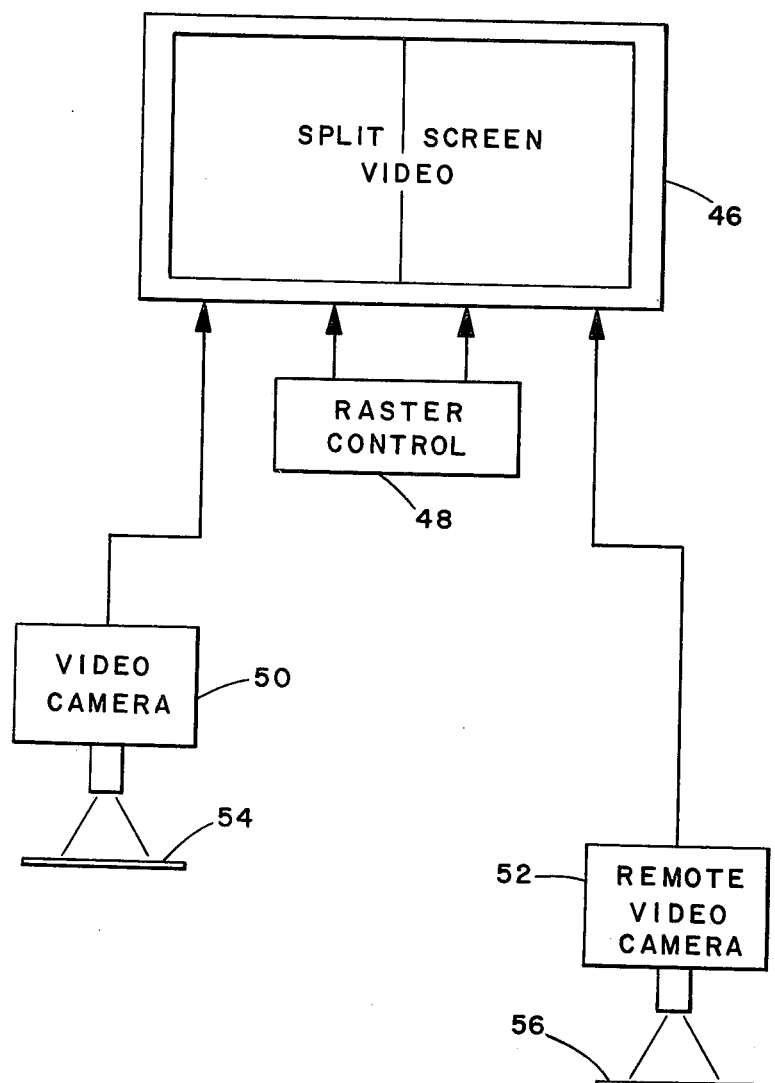
FIG. 8 is a schematic view of an alternate embodiment.

Other forms of recording, transfer and projection may also be utilized including electronic recording and transfer of the fingerprint by way of video screen. Turning to FIG. 8 an electronic system is disclosed including a split screen video 46 having a raster control 48 for independent and individual control of each screen half for shifting or rolling the images as desired. The input to the video screen may be cameras 50 and 52 one of which may be remote from the video and other camera. Separate samples 54 and 56 of prints may be viewed in separate locations such as at a guard gate, check-out counter, or the like, and a central records file. The prints may also be recorded on a video tape or other recording medium. With electronic transfer a central data bank of fingerprints may be maintained in an area and location to prevent any tampering.

Other forms of a record print may be maintained such as the provision of a record print directly on charge cards, identification card and the like when prepared. These may be prepared in a double lamination form such that any tampering destroys the cards thereby preventing any alteration of the print. Thus, only the rightful holder of the card can match the print.

In operation a copy of a pre-identified fingerprint is maintained in a card file or on a credit card, drivers license, identification card, charge card, check cashing card, or the like. A fresh copy of the fingerprint of the person to be identified is taken at the time of the transaction such as check cashing, charging, or entrance into security area. This fingerprint is taken in a simple manner by wiping the finger across a piece of treated paper or the like and pressing it onto a piece of tacky transparent plastic. This process produces an excellent print within a few seconds without a mess.

The pre-existing record fingerprint and the newly taken fingerprint are compared in an optical fingerprint comparator as above described which displays the two fingerprints as a moving mirror image of each other coming out of a common center dividing line as in the above described apparatus. If the images merge into or emerge from each other with matching patterns the two prints are from the same person. If the patterns do not match such as that illustrated in FIG. 6 then the prints are from two different persons and the credit or access as the case may be is denied that person. This occurs before the transaction or before access to a security area is gained by that person.

While I have illustrated and described my invention by means of specific embodiments it is to be understood that numerous changes and modifications may be made therein without departing from the spirit and scope of the invention as defined in the appended claims.

Having now described my invention I now claim:

1. An apparatus for displaying adjacent images from samples of fingerprints to be compared, said apparatus comprising a housing:
   a source of light mounted withint said housing;
   carrier means mounted to said housing for reciprocating sliding motion with respect thereto, said carrier means being formed with two fingerprint sample receiving portions, at least one said receiving portion being light transparent;
   means for mounting fingerprint samples to said sample receiving portions of said carrier means;
   a screen upon which images of said fingerprint samples are projected;
   means for reverting one of the images of said fingerprint samples for projecting said image as a mirror image, said reverting means comprising a single reflective element having two reflecting surfaces disposed at an angle to one another and joined at a common line; and
   optical means for projecting said images in side-by-side relationship on said screen, one of said images being the mirror image of the other whereby when said carrier means is moved 2. The apparatus of claim 1 wherein said fingerprint samples are transparent backing members having an opaque print image thereon.

3. The apparatus of claim 1 wherein said screen is a back projection screen, and wall means separates said optical paths adjacent said screen.

4. The apparatus recited in claim 1 wherein one said reflective surface is angularly adjustable with respect to the other.

5. An apparatus for displaying adjacent images from samples of fingerprints to be compared, said apparatus comprising;
   a housing;
   a source of light mounted within said housing;
   carrier means mounted to said housing for reciprocating sliding motion with respect thereto, said carrier means being formed with two fingerprint sample receiving portions, at least one said receiving portion being light transparent;

means for mounting fingerprint samples to said sample receiving portions of said carrier means;

a screen upon which images of said fingerprint samples are projected;

means for reverting one of the images of said fingerprint samples for projecting said image as a mirror image;

said reverting means comprises an integral corner mirror wherein the adjacent mirror surfaces are disposed at right angles to one another, each side of said mirror reflecting and reversing one half of the image onto the other side; and optical means for projecting said images in side-by-side image of the other whereby when said carrier means is moved laterally, the images on said screen move toward and away from each other and merge and emerge at a common line between the images.

6. The apparatus recited in claim 5 wherein one said reflective surface is angularly adjustable with respect to the other.

7. The apparatus of claim 5 wherein said fingerprint samples are transparent backing member having an opaque print image thereon.

8. The apparatus of claim 5 wherein said mirrors are mounted in an adjustable fixture.

* * * * *

UNITED STATES PATENT AND TRADEMARK OFFICE
CERTIFICATE OF CORRECTION

PATENT NO. : 4,458,993
DATED : July 10, 1984
INVENTOR(S) : Paul S. Kempf

It is certified that error appears in the above-identified patent and that said Letters Patent are hereby corrected as shown below:

Column 4, line 51, Claim 1, after the word "moved", add --laterally, the images on said screen move toward and away from each other and merge and emerge at a common line between the images--.

Signed and Sealed this

Eighth Day of January 1985

[SEAL]

Attest:

Attesting Officer

GERALD J. MOSSINGHOFF

Commissioner of Patents and Trademarks